United States Patent
Känsälä et al.

(10) Patent No.: US 7,251,331 B2
(45) Date of Patent: Jul. 31, 2007

(54) METHOD AND ARRANGEMENT FOR CONTROLLING ACCESS

(75) Inventors: Ilkka Känsälä, Oulu (FI); Mikko Lukkaroinen, Oulu (FI)

(73) Assignee: Nokia Corporation, Espoo (FI)

( * ) Notice: Subject to any disclaimer, the term of this patent is extended or adjusted under 35 U.S.C. 154(b) by 739 days.

(21) Appl. No.: 10/410,544

(22) Filed: Apr. 9, 2003

(65) Prior Publication Data

US 2003/0194089 A1 Oct. 16, 2003

(30) Foreign Application Priority Data

Apr. 10, 2002 (FI) .................................. 20020688

(51) Int. Cl.
 *H04L 29/02* (2006.01)
 *H04L 13/18* (2006.01)
 *H04L 29/06* (2006.01)

(52) U.S. Cl. ...................... 380/270; 380/229; 713/156; 713/168

(58) Field of Classification Search ................ 380/229, 380/270; 713/156, 168
See application file for complete search history.

(56) References Cited

U.S. PATENT DOCUMENTS

| | | | |
|---|---|---|---|
| 5,614,703 A | | 3/1997 | Martin et al. |
| 6,075,861 A | | 6/2000 | Miller, II |
| 6,161,005 A | | 12/2000 | Pinzon |
| 6,295,448 B1 | | 9/2001 | Hayes, Jr. et al. |
| 2002/0035515 A1 | * | 3/2002 | Moreno ........................ 705/26 |
| 2002/0087429 A1 | * | 7/2002 | Shuster ......................... 705/26 |
| 2002/0099945 A1 | * | 7/2002 | McLintock et al. .......... 713/186 |
| 2002/0180582 A1 | * | 12/2002 | Nielsen ........................ 340/5.6 |
| 2003/0018753 A1 | | 1/2003 | Seki |
| 2003/0050806 A1 | * | 3/2003 | Friesen et al. .................. 705/5 |
| 2003/0179073 A1 | * | 9/2003 | Ghazarian .................... 340/5.6 |
| 2005/0165612 A1 | * | 7/2005 | Van Rysselberghe .......... 705/1 |

FOREIGN PATENT DOCUMENTS

| | | |
|---|---|---|
| EP | 0 762 707 | 3/1997 |
| EP | 0 810 559 | 12/1997 |
| EP | 1 271 418 | 6/2001 |
| WO | WO 94/01963 | 1/1994 |
| WO | WO 01/40605 | 6/2001 |
| WO | WO 01/63425 | 8/2001 |
| WO | WO 02/23880 | 3/2002 |

\* cited by examiner

*Primary Examiner*—Gilberto Barrón, Jr.
*Assistant Examiner*—Venkat Perungavoor
(74) *Attorney, Agent, or Firm*—Hollingsworth & Funk, LLC

(57) ABSTRACT

The invention describes a method for controlling access in a telecommunication system comprising a first transmitter-receiver unit, a second transmitter-receiver unit and a remote-controllable server. The method comprises establishing a telecommunication connection from the first transmitter-receiver unit to the remote-controllable server; transmitting an electric form from the first transmitter-receiver unit to the remote-controllable server in order to unlock a lock, the form including a digital signature and a certificate indicating the authenticity of a user of the first transmitter-receiver unit; transmitting a message from the remote-controllable server to the second transmitter-receiver unit to indicate that the electric form has been received, the message including the certificate indicating the authenticity of the user of the first transmitter-receiver unit; transmitting a command to unlock the lock from the second transmitter-receiver unit to the remote-controllable server, and unlocking at least one lock.

18 Claims, 2 Drawing Sheets

METHOD AND ARRANGEMENT FOR CONTROLLING ACCESS

FIELD

Figure 1:
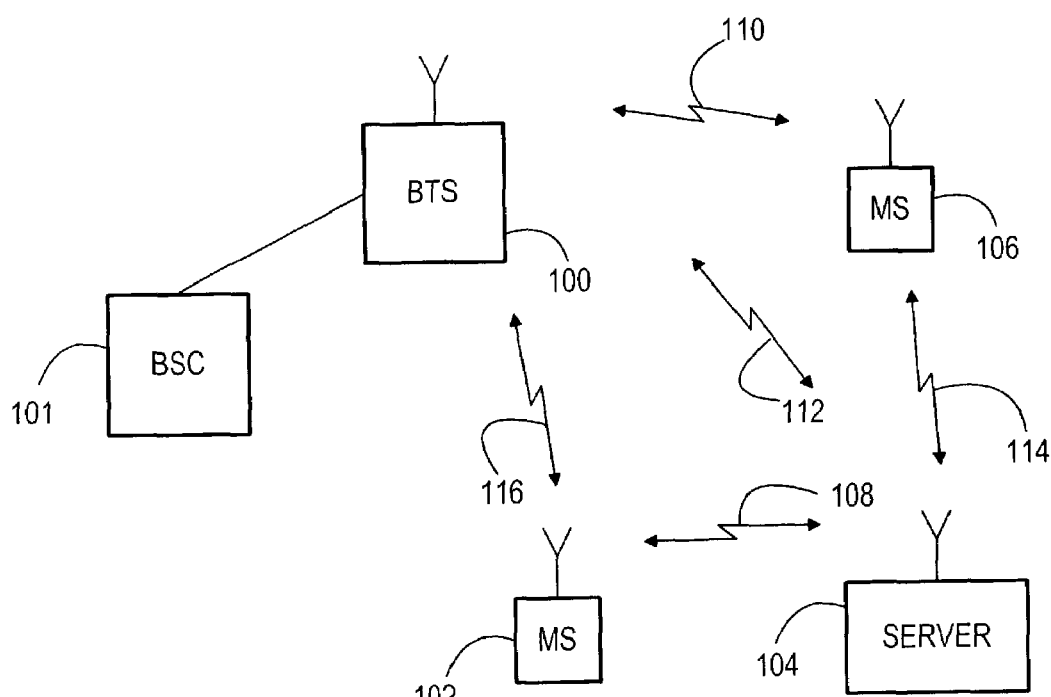

The invention relates to a method and an arrangement for controlling access in locations wherein access is restricted by a lock mechanism.

BACKGROUND

In order to access locked premises, such as home or work, keys or key cards, for example, are still required for unlocking locks. For safety reasons, it is also increasingly common that people lock the doors and gates to backyards, housing sites or commercial buildings. This can be problematic when, for example, persons should have access to locked premises to which they do not have physical keys. Such a situation may occur when, for example, a resident is away from home and somebody, e.g. a cleaning service worker or a plumber, should have access to the locked premises. Such situations have usually been solved e.g. using master keys, hiding keys or, in the case of an electronic lock, for example, using ad hoc key codes.

Handing over conventional keys or cards to outsiders does, however, involve an increased safety risk. Keys may easily be lost, which means that the locks would have to be changed. Furthermore, even if e.g. a serviceman had a key, the key could be used for only as long as a corresponding lock is in use. It is also difficult to deliver extra keys e.g. to persons who only visit locked premises once, such as chimney sweepers. The use of electronic key codes is also problematic. Key codes are difficult to remember, and such codes require separate procedures in order to be activated. Furthermore, situations occur daily wherein somebody who has been authorized to conduct a task has not informed anybody about his or her visit in advance, so it has thus not been even possible to deliver a key or a code to such a person in advance. Furthermore, taking safety aspects into account considerably complicates the cooperation between people. For example, handing over a key code on the telephone to somebody asking for access would of course be possible, but the provider of the code would then immediately have to have the codes changed so as to prevent the particular person from using the same code later and entering the locked premises or from forwarding the code. A situation wherein access to locked premises is directly remotely controllable through a remote-controllable locking system, for example, would also involve a safety problem; in such a case, the remotely-situated controller of the locking system could not be sure of the identity of the person who wishes to be let in, nor whether it would be safe to grant access to such a person.

BRIEF DESCRIPTION

An object of the invention is thus to provide a method and an arrangement so as to avoid the above-mentioned problems. This is achieved by a method for controlling access in a telecommunication system comprising a first transmitter-receiver unit, a second transmitter-receiver unit and a remote-controllable server. The method of the invention comprises establishing a telecommunication connection from the first transmitter-receiver unit to the remote-controllable server; transmitting an electric form from the first transmitter-receiver unit to the remote-controllable server in order to unlock a lock, the form including a digital signature and a certificate indicating the authenticity of a user of the first transmitter-receiver unit; transmitting a message from the remote-controllable server to the second transmitter-receiver unit to indicate that the electric form has been received, the message including the certificate indicating the authenticity of the user of the first transmitter-receiver unit; transmitting a command to unlock the lock from the second transmitter-receiver unit to the remote-controllable server, and unlocking at least one lock by means of the remote-controllable server on the basis of the command to unlock the lock transmitted by the second transmitter-receiver unit.

The invention further relates to an arrangement for controlling access, the arrangement comprising a first transmitter-receiver unit which includes means for establishing a telecommunication connection, means for supporting a public key infrastructure; a second transmitter-receiver unit which includes means for supporting a public key infrastructure, means for establishing a telecommunication connection; a remote-controllable server to be used as a communications device between the first and the second transmitter-receiver unit, the remote-controllable server including means for establishing telecommunication connections and means for unlocking a lock. In the arrangement of the invention, the first transmitter-receiver unit is configured to transmit an electric form to the remote-controllable server in order to unlock the lock, the electronic form including a digital signature and a certificate indicating the authenticity of a user of the first transmitter-receiver unit; the remote-controllable server is configured to transmit a message from the remote-controllable server to the first transmitter-receiver unit to indicate that the electric form has been received, the message including the certificate indicating the authenticity of the user of the first transmitter-receiver unit, and to unlock the lock on the basis of the command to unlock the lock transmitted by the second transmitter-receiver unit; the second transmitter-receiver unit is configured to transmit the command to unlock the lock to the remote-controllable server.

Preferred embodiments of the invention are disclosed in the dependent claims.

The method and arrangement of the invention provide several advantages. One of the advantages of the invention is that the authenticity of a person asking for access is indicated by including a certificate granted by a certificate authority in the communication of an arrangement comprising mobile stations and a locking system operating therebetween. The solution of the invention thus provides a safe and easy-to-use way to ensure that access to locked premises will be granted to reliable persons only. Another advantage of the invention is, for example, that no keys or codes need to be delivered to persons external to the system in connection with one-time visits to locked premises.

LIST OF DRAWINGS

Figure 2:
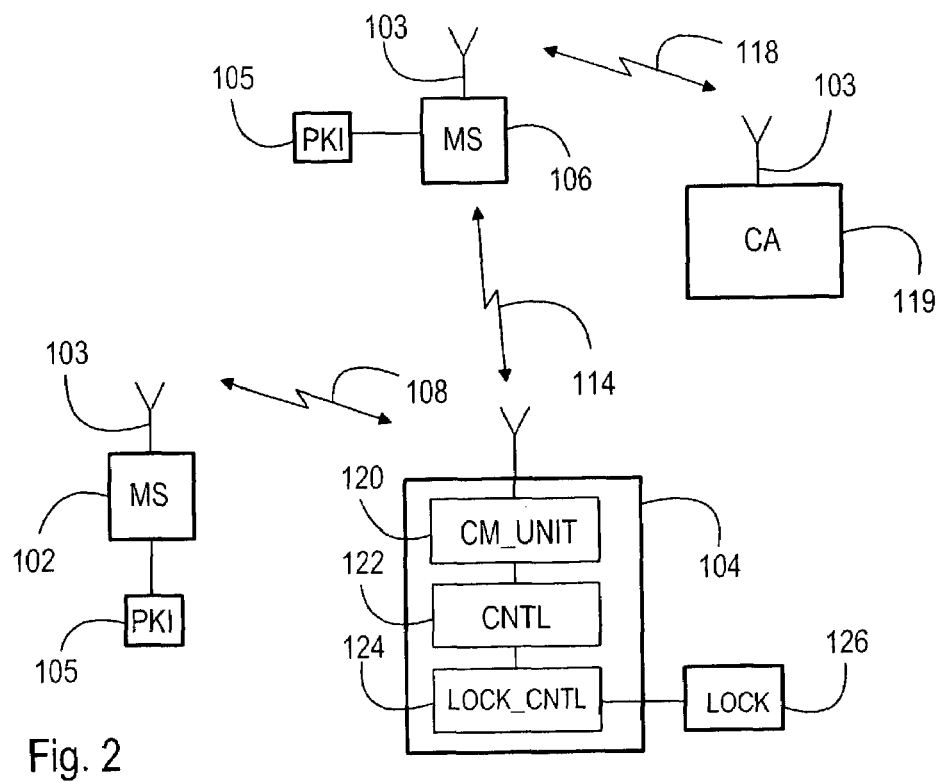
Figure 3:
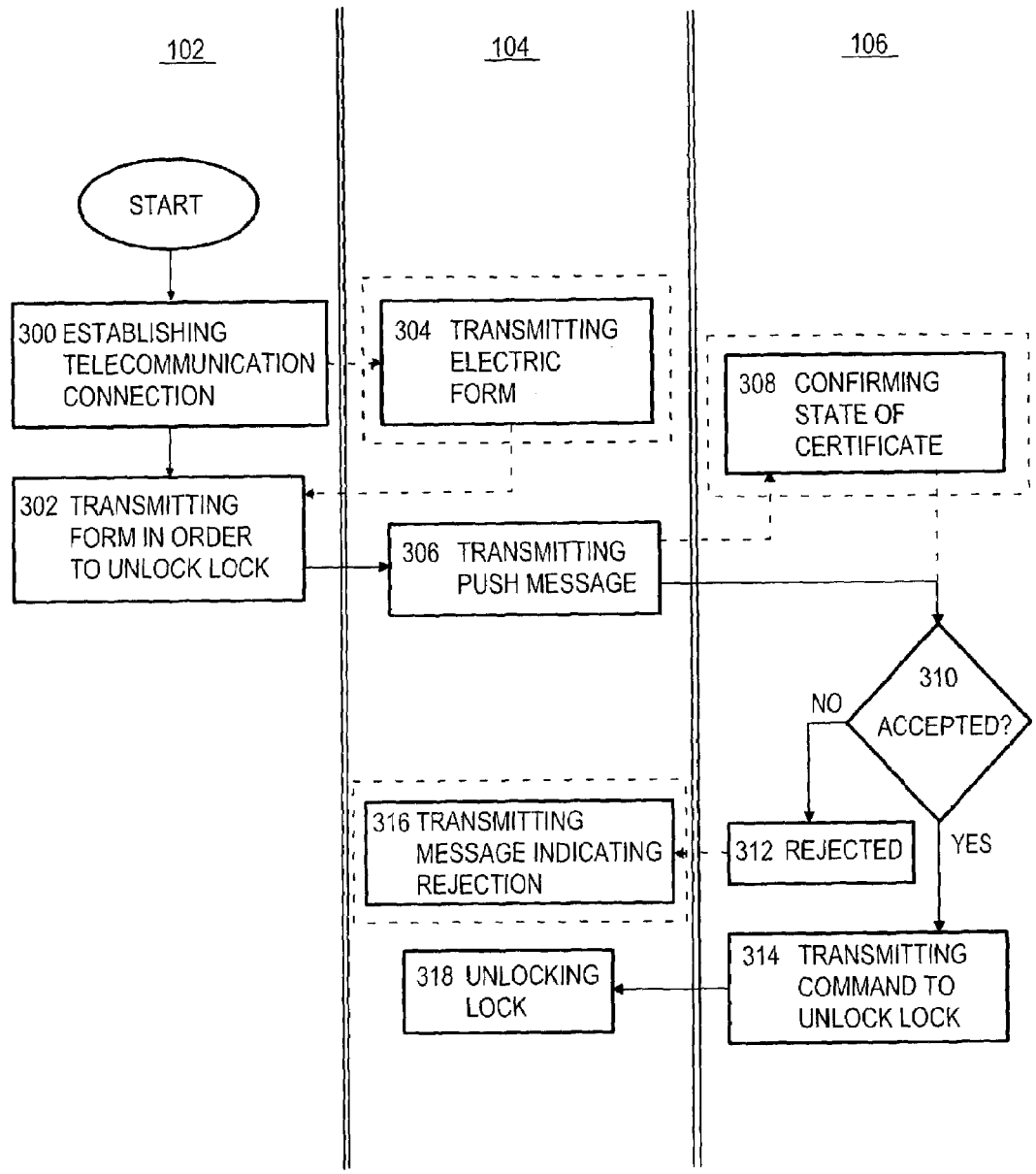

The invention is now described in closer detail in connection with the preferred embodiments and with reference to the accompanying drawings, in which FIG. 1 is a diagram illustrating the structure of a telecommunication system according to the invention, FIG. 2 is a diagram showing an arrangement according to the invention for controlling access, FIG. 3 is a flow diagram illustrating a method of the invention.

DESCRIPTION OF EMBODIMENTS

The preferred embodiments of the invention can be applied to telecommunication systems that include a remote-controllable server, one or more base transceiver stations and a plurality of terminals communicating with one or more base transceiver stations. The essential parts of the structure of the telecommunication system may resemble those shown in FIG. 1. The telecommunication system comprises a base transceiver station 100 and a plurality of transmitter-receiver units 102, 106 having a duplex connection 110, 116 to the base transceiver station 100. The base transceiver station 100 transmits the connections of the transmitter-receiver units 102, 106 to a base station controller 101, which forwards the connections to other parts of the system and to a fixed network. The base station controller 101 controls the operation of one or more base transceiver stations. The telecommunication system further includes a remote-controllable server 104 having a duplex connection 108, 112, 114 to the transmitter-receiver units 102, 106 and to the base transceiver station 100.

FIG. 2 shows an arrangement according to an embodiment of the invention for controlling access. FIG. 2 shows a first transmitter-receiver unit 102, a second transmitter-receiver unit 106 and a remote-controllable server 104. The transmitter-receiver units 102, 106 and the remote-controllable server 104 share a duplex telecommunication connection 108, 114. The arrangement of FIG. 2 further comprises a certificate authority 119 having a duplex connection 118 with the second transmitter-receiver unit 106.

Today, various methods are known which enable the mutual trust of different parties that communicate in telecommunication systems to be improved. One such method is a so-called Public Key Infrastructure (PKI), which enables a safe way of communicating in a public network, such as the Internet. The PKI enables the mutual trust between communicating parties to be enhanced by means of trusted third parties. In practice, this is implemented using a Public Key Cryptography (PKC), digital signatures and certificates that tie the public keys to the communicating parties. Certificate Authorities (CA), which grant digital certificates and confirm the authenticity of the certificates to be used, serve as Trusted Third Parties (TTP).

The creation of digital signatures utilizes private keys and asymmetric encryption algorithms known per se. The certificates, in turn, tie the name to a public key, thus providing a way to indicate the authenticity of a holder of a public key. The certificates, which are based on the IETF standard X.509, for example, include at least a public key, the name of the holder of the key, the name of the certificate authority (certificate granter), the serial number and validity time of the certificate, and the digital signature of the certificate authority. The idea of the certificate is that if a communicating party knows the public key of the certificate authority and trusts the certificate authority, the communicating party can also trust the material the certificate authority has signed.

In an embodiment of the invention according to FIG. 2, the first transmitter-receiver unit 102 includes means 103, such as a Bluetooth chip or a transmitter-receiver function implemented by means of a WLAN or infrared connection, for establishing a short-range telecommunication connection. The first transmitter-receiver unit 102 also comprises means 105 for supporting a public key infrastructure PKI and means 103 for establishing a telecommunication connection. The first transmitter-receiver unit 102 may be e.g. a mobile telephone or another device which includes similar telecommunication equipment, such as a portable computer.

Similarly, the second transmitter-receiver unit 106 shown in FIG. 2 comprises means 105 for supporting a public key infrastructure PKI and means 103 for establishing a telecommunication connection. Similarly, the second transmitter-receiver unit 106 may be e.g. a mobile telephone or another device which includes similar telecommunication equipment, such as a portable computer or a palm-sized computer.

In the example of FIG. 2, the remote-controllable server 104 comprises a communications unit 120, a control unit 122 and a lock controller 124, which controls a lock mechanism 126, such as a lock of a door or a gate. The controller of the remote-controllable server 104 may transmit commands to the remote-controllable server 104 through the second transmitter-receiver unit 106. The communications unit 120 of the remote-controllable server 104 is responsible for receiving and transmitting signals and for establishing short-range connections, such as Bluetooth or infrared connections, and long-range connections, such as the Internet, CSD and GPRS ones, between the server 104 and the devices connected thereto. The basic functions of the remote-controllable server 104 are controlled by the control unit 122, which is typically implemented by means of a microprocessor and software or separate components. The lock controller 124 is connected to the lock mechanism 126 e.g. by an electric or mechanical connection or by a wireless telecommunications link.

Examine the function of the system according to FIG. 2 by means of an example. In the example, the first transmitter-receiver unit 102 is to ask the remote-controllable server 104 controlled by the second transmitter-receiver unit 106 to unlock the lock 126. First, the means 103 of the first transmitter-receiver unit 102 for establishing a short-range telecommunication connection establish a short-range telecommunication connection, such as a Bluetooth or infrared connection, to the remote-controllable server 104. Next, controlled by the communications unit 120 and the control unit 122, the server 104 sends the first transmitter-receiver unit 102 an inquiry, such as an electric form or the like, to be filled in. Alternatively, the first transmitter-receiver unit 102 may already be provided with electric forms for different situations from among which an appropriate one can be selected and filled in at the first transmitter-receiver unit 102.

Next, at the first transmitter-receiver unit 102, the information required in the electric form, such as the name of a visitor or the reason of a visit, is filled in. Furthermore, at the PKI unit 105 of the first transmitter-receiver unit 102, the digital signature of the visitor is included in the form. A digital signature is a character string, which is formed using cryptographic methods known per se so as to enable the identity of the transmitter and the integrity of the transmitted material to be ensured. In addition to the digital signature, a certificate to indicate the authenticity of the visitor is included in the form at the PKI unit 105, the certificate including the visitor's name and public key, the name of the certificate authority, i.e. the granter of the certificate, the serial number and validity time of the certificate, and the digital signature of the certificate authority. Next, the first transmitter-receiver unit 102 transmits the electric form, including the digital signature and the certificate attached thereto, to the server 104.

Next, the remote-controllable server 104 sends the second transmitter-receiver unit 106 a message, such as a push message, indicating that the electric form has been received; the server 104 has also included the certificate received from the first transmitter-receiver unit 102 into the message. Since the second transmitter-receiver unit 106 is thus provided with the certificate which is signed by a trusted certificate authority and which comprises the visitor's name and public key, it is safe to trust that the holder of the public key, i.e. the visitor, is provided with exactly the same name as indicated in the certificate. Next, the authenticity of the visitor's name is confirmed at the PKI unit 105 of the second transmitter-receiver unit 106 by using the public key provided in the certificate. Next, if the holder of the second transmitter-receiver unit 106 accepts the reason of the visitor's call, a command to unlock the lock can be transmitted from the second transmitter-receiver unit 106 to the remote-controllable server 104.

The certificate authority 119 releases Certification Revocation Lists (CRL) in order to prevent unauthorized use of the certificates. Those who have misused their certificate are listed in a CRL. Those who have been granted a certificate may check the CRL before trusting the certificate. Therefore, before transmitting the command to unlock the lock, a telecommunication connection, such as an Internet connection, can first be established from the second transmitter-receiver unit 106 to the certificate authority 119 to make sure that the visitor's certificate is not on the CRL. Information about the authenticity of the certificate can be provided e.g. on the display of the second transmitter-receiver unit 106 by means of the protocol used by the certificate authority 119, such as protocols called Online Certificate Status Protocol (OCSP), Simple Certificate Validation Protocol (SCVP) or XML Key Management Specification (XKMS).

When the remote-controllable server 104 has received the command to unlock the lock transmitted by the second transmitter-receiver unit 106, the lock 126 is unlocked, controlled by the lock controller 124 and the control unit 122.

Let us next view a method according to an embodiment of the invention shown in FIG. 3 by means of a flow diagram. For the sake of clarity, the method steps carried out by the first transmitter-receiver unit 102, the second transmitter-receiver unit 106 and the remote-controllable server 104 are separated into their own areas by using double lines in FIG. 3.

In step 300 in FIG. 3, a telecommunication connection is established from the first transmitter-receiver unit, such as mobile equipment or a portable computer, to a remote-controllable server. The telecommunication connection to be established is e.g. a wireless short-range connection, such as a Bluetooth or infrared connection. Alternatively, the first transmitter-receiver unit establishes a telecommunication connection by using e.g. a mobile telephone network or a Short Message Service (SMS). Next, in step 302, an electric form requesting a lock to be unlocked is transmitted from the first transmitter-receiver unit. The form is provided with the required information, such as the reason of a visitor's call. Furthermore, the form is provided with the digital signature of the visitor, i.e. the user of the first transmitter-receiver unit, and a certificate indicating the authenticity of the visitor. The electric form can be provided in the menus of the first transmitter-receiver unit, wherefrom it can be selected and shown on the display of the unit. Alternatively, in step 304, the electric form can be requested from the remote-controllable server which, on request, transmits the electric form to the first transmitter-receiver unit. The arrows and steps circumscribed by broken lines in FIG. 3 are used for depicting alternative method steps.

As distinct from the example of FIG. 3, it is possible in step 300 either to send a text message or set up a voice or video connection from the first transmitter-receiver unit to the second transmitter-receiver unit and use the established connection for explaining the reasons of the visit. A text, voice and/or video message and a digital signature may also be combined into one multimedia message (MMS). Such a multimedia message can be transmitted either directly via a telecommunication network, or via a remote-controllable server.

In step 306, a message, such as a push message, indicating that the electric form has been received is transmitted from the remote-controllable server to the second transmitter-receiver unit. The push message indicates the reason of the visit and that the visitor using the first transmitter-receiver unit is requesting the lock to be unlocked. The push message further contains the digital certificate of the visitor. Since the holder of the second transmitter-receiver unit controlling the remote-controllable server can trust the certificate signed by a trusted certificate granter and the digital signature, next, the process may directly proceed to step 310, wherein a decision is made about whether or not to accept the request to unlock the lock. Alternatively, the process may further proceed from step 306 to step 308 to confirm the state of the visitor's certificate. In step 308, a telecommunication connection, e.g. an Internet connection, is established to a certificate authority in order to check that the visitor's certificate is not on a Certification Revocation List, CRL. In step 308, it is possible to transmit a message to the certificate authority and ask the certificate authority to send the second transmitter-receiver unit a reply indicating whether or not the visitor's certificate is authentic.

If, in step 310, for one reason or another, the visitor's request is not to be accepted, the process moves to step 312, wherein the request to unlock the lock is rejected. Information about the rejection is transmitted to the remote-controllable server, which may e.g. transmit a message indicating the rejection to the first transmitter-receiver unit. If, on the other hand, in step 310 a decision is made to accept the request to unlock the lock, the process moves to step 314, wherein a command to unlock the lock is transmitted to the remote-controllable server. Information about the acceptance of the request to unlock the lock can also be transmitted to the first transmitter-receiver unit e.g. as a text message. The communication between the second transmitter-receiver unit and the remote-controllable server can utilize identification methods between, server and client known per se in order to encrypt the communication therebetween and to ensure the authenticity of the server and the transmitter-receiver unit. The command to unlock the lock may include the digital signature of the holder of the second transmitter-receiver unit and a time stamp. The digital signature can be used for ensuring that no one that has gained unauthorized access e.g. to the second transmitter-receiver unit is able to use it for unlocking the lock. When the digital signature is used, the remote-controllable server must also be provided with equipment to enable the identification systems to be used. The use of a time stamp also prevents outsiders from monitoring and copying the command to unlock the lock and using this command to unlock the lock later.

In step 318, the remote-controllable server unlocks the lock on the basis of the received command to unlock the lock. Alternatively, the server may also unlock several locks in a specific order, should the locked premises reside behind several locked doors. In such a case, the first transmitter-receiver unit and the remote-controllable server can agree upon which lock is to be unlocked at a given time; however, the authorization granted by the second transmitter-receiver unit is valid only for a predetermined, limited period of time.

Although the invention has been described above with reference to the example according to the accompanying drawings, it is obvious that the invention is not restricted thereto but can be modified in many ways within the scope of the inventive idea disclosed in the attached claims.

The invention claimed is:

1. A method for controlling access in a telecommunication system comprising a first transmitter-receiver unit, a second transmitter-receiver unit and a remote-controllable server, the method comprising:

establishing a telecommunication connection from the first transmitter-receiver unit to the remote-controllable server;

transmitting an electric form from the first transmitter-receiver unit to the remote-controllable server in order to unlock a lock, the form including a digital signature and a certificate indicating the authenticity of a user of the first transmitter-receiver unit; transmitting a message from the remote-controllable server to the second transmitter-receiver unit to indicate that the electric form has been received, the message including the certificate indicating the authenticity of the user of the first transmitter-receiver unit;

transmitting a command to unlock the lock from the second transmitter-receiver unit to the remote-controllable server, and unlocking at least one lock by means of the remote-controllable server on the basis of the command to unlock the lock transmitted by the second transmitter-receiver unit.

2. A method as claimed in claim 1, wherein the telecommunication connection to be established from the first transmitter-receiver unit to the remote-controllable server is a short-range wireless connection.

3. A method as claimed in claim 2, wherein the short-range wireless connection is a WLAN, Bluetooth or an infrared connection.

4. A method as claimed in claim 1, wherein the certificate indicating the authenticity of the user includes the user's public key.

5. A method as claimed in claim 1, wherein the method further comprises confirming the authenticity of the certificate of the user of the first transmitter-receiver unit from a certificate authority.

6. A method as claimed in claim 1, wherein the method further comprises transmitting the electric form from the remote-controllable server to the first transmitter-receiver unit to be filled in.

7. A method as claimed in claim 1, wherein the method further comprises transmitting a message to the first transmitter-receiver unit to indicate that the command to unlock the lock has been transmitted, after the command to unlock the lock has been transmitted.

8. A method as claimed in claim 1, wherein the method further comprises transmitting a message to the first transmitter-receiver unit to indicate that a request to unlock the lock has been rejected, if no command to unlock the lock is transmitted.

9. A method as claimed in claim 1, wherein the method further comprises using public key infrastructure methods in the data transfer between the remote-controllable server and the second transmitter-receiver unit.

10. A method as claimed in claim 1, wherein the method further comprises using a time stamp in the data transfer between the remote-controllable server and the second transmitter-receiver unit.

11. An arrangement for controlling access, the arrangement comprising:

a first transmitter-receiver unit which includes means for establishing a telecommunication connection, means for supporting a public key infrastructure;

a second transmitter-receiver unit which includes means for supporting a public key infrastructure, means for establishing a telecommunication connection;

a remote-controllable server to be used as a communications device between the first and the second transmitter-receiver unit, the remote-controllable server including means for establishing telecommunication connections and means for unlocking a lock, wherein:

the first transmitter-receiver unit is configured to transmit an electric form to the remote-controllable server in order to unlock the lock, the electronic form including a digital signature and a certificate indicating the authenticity of a user of the first transmitter-receiver unit;

the remote-controllable server is configured to transmit a message from the remote-controllable server to the second transmitter-receiver unit to indicate that the electric form has been received, the message including the certificate indicating the authenticity of the user of the first transmitter-receiver unit, and to unlock the lock on the basis of the command to unlock the lock transmitted by the second transmitter-receiver unit;

the second transmitter-receiver unit is configured to transmit the command to unlock the lock to the remote-controllable server.

12. An arrangement as claimed in claim 11, wherein the first transmitter-receiver unit includes means for establishing a short-range telecommunication connection.

13. An arrangement as claimed in claim 11, wherein the remote-controllable server is configured to transmit the electronic form to the first transmitter-receiver unit to be filled in.

14. An arrangement as claimed in claim 11, wherein the second transmitter-receiver unit is configured to confirm the authenticity of the certificate of the user of the first transmitter-receiver unit from a certificate authority.

15. An arrangement as claimed in claim 11, wherein the remote-controllable server is configured to transmit a message to the first transmitter-receiver unit to indicate that the command to unlock the lock has been transmitted.

16. An arrangement as claimed in claim 11, wherein the remote-controllable server is configured to transmit a message to the first transmitter-receiver unit to indicate that a request to unlock the lock has been rejected, if no command to unlock the lock is transmitted.

17. An arrangement as claimed in claim 11, wherein the remote-controllable server includes means for supporting a public key infrastructure.

18. An arrangement as claimed in claim 11, wherein the remote-controllable server and the second transmitter-receiver unit are configured to use a time stamp in the data transfer between the remote-controllable server and the second transmitter-receiver unit.

* * * * *